US009268326B2

(12) United States Patent
Treiber et al.

(10) Patent No.: US 9,268,326 B2
(45) Date of Patent: Feb. 23, 2016

(54) COMPUTER APPARATUS AND METHOD FOR REAL-TIME MULTI-UNIT OPTIMIZATION

(75) Inventors: Steven S. Treiber, Toronto (CA); Ronald S. McLeod, Oakville (CA)

(73) Assignee: Manufacturing Technology Network Inc., Toronto (CA)

(*) Notice: Subject to any disclaimer, the term of this patent is extended or adjusted under 35 U.S.C. 154(b) by 456 days.

(21) Appl. No.: 13/817,048

(22) PCT Filed: Aug. 17, 2011

(86) PCT No.: PCT/CA2011/050503
§ 371 (c)(1),
(2), (4) Date: Apr. 25, 2013

(87) PCT Pub. No.: WO2012/021995
PCT Pub. Date: Feb. 23, 2012

(65) Prior Publication Data
US 2013/0204420 A1 Aug. 8, 2013

Related U.S. Application Data

(60) Provisional application No. 61/374,877, filed on Aug. 18, 2010.

(51) Int. Cl.
G05B 15/00 (2006.01)
G05D 3/12 (2006.01)
G05B 19/418 (2006.01)
(Continued)

(52) U.S. Cl.
CPC .......... *G05B 19/41865* (2013.01); *G05B 11/32* (2013.01); *G05B 13/042* (2013.01); *G06Q 10/06395* (2013.01); *Y02P 90/20* (2015.11)

(58) Field of Classification Search
CPC ............. G05B 19/41865; G05B 11/32; G05B 13/042; G06Q 10/06395; Y02P 90/20
USPC .................................................. 700/266, 282
See application file for complete search history.

(56) References Cited

U.S. PATENT DOCUMENTS 4,736,316 A * 4/1988 Wallman ......................... 700/29
5,347,446 A * 9/1994 Iino et al. ....................... 700/29
(Continued)

OTHER PUBLICATIONS

Basset et al., "Application of Predictive Control Technology at BP's Crude Oil Terminal at Grangemouth", IEEE, 1999, 4 pages.*
(Continued)

*Primary Examiner* — Carlos Ortiz Rodriguez
*Assistant Examiner* — Thomas Stevens
(74) *Attorney, Agent, or Firm* — Jenna L. Wilson; Dimock Stratton LLP (Firm)

(57) ABSTRACT

A method and system for real-time optimization of a process scheduled using a single-period or multi-period, steady-state planning model and optimization program, and is controlled by means of linear or non-linear multivariable constraint controls. A steady-state model based on first principles of chemistry and physics of a plant is applied with a non-linear optimizer to calculate the optimum operating point of said oil refinery at any desired frequency such that the refinery can be considered to be operating in steady-state. The optimum is a function of the price of feedstocks, products and intermediate streams as provided by the refinery planning optimization. The solution is implemented automatically by linear or non-linear multivariable constraint controllers operating each of the processing units of said plant.

23 Claims, 6 Drawing Sheets

(51) Int. Cl.
*G05B 11/32* (2006.01)
*G05B 13/04* (2006.01)
*G06Q 10/06* (2012.01)

(56) References Cited

U.S. PATENT DOCUMENTS

| | | | |
|---|---|---|---|
| 5,396,416 A * | 3/1995 | Berkowitz et al. | 700/45 |
| 5,457,625 A * | 10/1995 | Lim et al. | 700/29 |
| 5,732,193 A * | 3/1998 | Aberson | 706/45 |
| 6,038,540 A * | 3/2000 | Krist et al. | 705/7.33 |
| 6,101,447 A | 8/2000 | Poe, Jr. | |
| 6,285,971 B1 * | 9/2001 | Shah et al. | 703/2 |
| 6,434,435 B1 | 8/2002 | Tubel et al. | |
| 6,507,774 B1 * | 1/2003 | Reifman et al. | 700/274 |
| 6,611,735 B1 * | 8/2003 | Henly et al. | 700/266 |
| 6,654,649 B2 | 11/2003 | Treiber et al. | |
| 6,718,234 B1 * | 4/2004 | Demoro | B01J 19/0033 700/269 |
| 7,346,404 B2 | 3/2008 | Eryurek et al. | |
| 7,463,937 B2 | 12/2008 | Korchinski | |
| 7,966,331 B2 | 6/2011 | Gardner et al. | |
| 2003/0046130 A1 | 3/2003 | Golightly et al. | |
| 2003/0125818 A1 | 7/2003 | Johnson | |
| 2004/0049300 A1 * | 3/2004 | Thiele et al. | 700/29 |
| 2006/0047366 A1 * | 3/2006 | Boyden et al. | 700/266 |
| 2006/0190113 A1 | 8/2006 | Boutemy et al. | |
| 2007/0055392 A1 * | 3/2007 | D'Amato et al. | 700/44 |
| 2007/0100475 A1 * | 5/2007 | Korchinski | 700/28 |
| 2007/0168057 A1 * | 7/2007 | Blevins et al. | 700/53 |
| 2007/0168065 A1 * | 7/2007 | Nixon | G05B 19/0426 700/83 |
| 2007/0225835 A1 * | 9/2007 | Zhu | 700/44 |
| 2008/0082195 A1 * | 4/2008 | Samardzija | 700/109 |
| 2008/0195235 A1 | 8/2008 | Rund | |
| 2008/0243310 A1 * | 10/2008 | Esposito et al. | 700/268 |
| 2009/0157590 A1 | 6/2009 | Mijares et al. | |
| 2009/0166033 A1 | 7/2009 | Brouwer et al. | |
| 2010/0036537 A1 | 2/2010 | Bieker et al. | |
| 2010/0152900 A1 * | 6/2010 | Gurciullo | C01B 3/384 700/272 |
| 2010/0228688 A1 * | 9/2010 | Little et al. | 705/413 |
| 2010/0274368 A1 | 10/2010 | Terndrup | |
| 2012/0083914 A1 | 4/2012 | Kocis et al. | |

OTHER PUBLICATIONS

Cutler et al., "Real Time Optimization with Multivariable Control is Required to Maximize Profits," Computers and Chemical Engineering, vol. 7, No. 5, 1983, pp. 663-667.

Jacob et al., "A Lumping and Reaction Scheme for Catalytic Cracking," AIChE Journal, vol. 22, No. 4, Jul. 1976, pp. 701-713.

European Search Report and Opinion dated Apr. 11, 2014 from EP 11817628.8, 4 pgs.

* cited by examiner

Figure 1: Simplified Refinery Flow Diagram

| Symbol | Component | Cut Temperature |
|---|---|---|
| Crude & Vacuum Distillation | | |
| C2 | Ethane | -127.5 |
| C3 | Propane | -43.7 |
| IC4 | iso-Butane | -10.9 |
| NC4 | n-Butane | 31.1 |
| LN | Light Naphtha | 170.0 |
| LHS | LtNap/HyNap Swing | 180.0 |
| HN | Heavy Naphtha | 295.0 |
| HKS | HyNap/Kero Swing | 350.0 |
| KER | Kerosene | 480.0 |
| KDS | Kero/Dsl Swing | 500.0 |
| DSL | Diesel | 650.0 |
| DAS | Dsl/AGO Swing | 680.0 |
| AGO | AGO | 710.0 |
| LVG | LVGO | 810.0 |
| HVG | HVGO | 1,050.0 |
| VR | Vacuum Resid | 1,832.0 |

| Symbol | Component |
|---|---|
| Hydrocracker | |
| H2 | Hydrogen |
| C1 | Methane |
| C2 | Ethane |
| C3 | Propane |
| IC4 | iso-Butane |
| NC4 | n-Butane |
| LHC | Light Naphtha |
| LHH | LtNap/HyNap Swing |
| HHC | Heavy Naphtha |
| HKH | HyNap/Kero Swing |
| KHC | Kerosene |
| KDH | Kero/Dsl Swing |
| DHC | Diesel |
| DBH | Dsl/Btms Swing |
| BHC | Bottoms |

| Symbol | Component |
|---|---|
| FCCU | |
| H2 | Hydrogen |
| C1 | Methane |
| C2s | C2s |
| C3 | Propane |
| C3= | Propylene |
| IC4 | iso-Butane |
| NC4 | n-Butane |
| C4= | Butenes |
| LFC | Lt FCC Gasoline |
| HFC | Hy FCC Gasoline |
| LCO | LCO |
| DEC | Decant |
| COK | Coke |

| Symbol | Component |
|---|---|
| Other | |
| H2O | Water |
| REF | Reformate |
| ALK | Alkylate |

Figure 2A

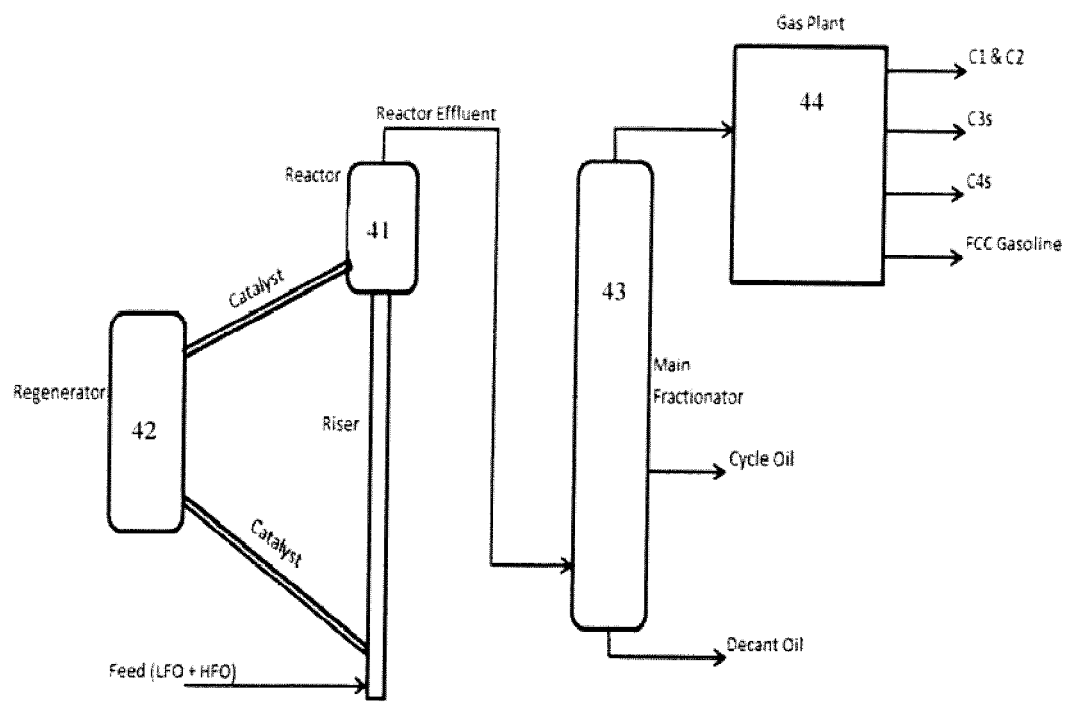
Figure 4: FCCU Flow Diagram

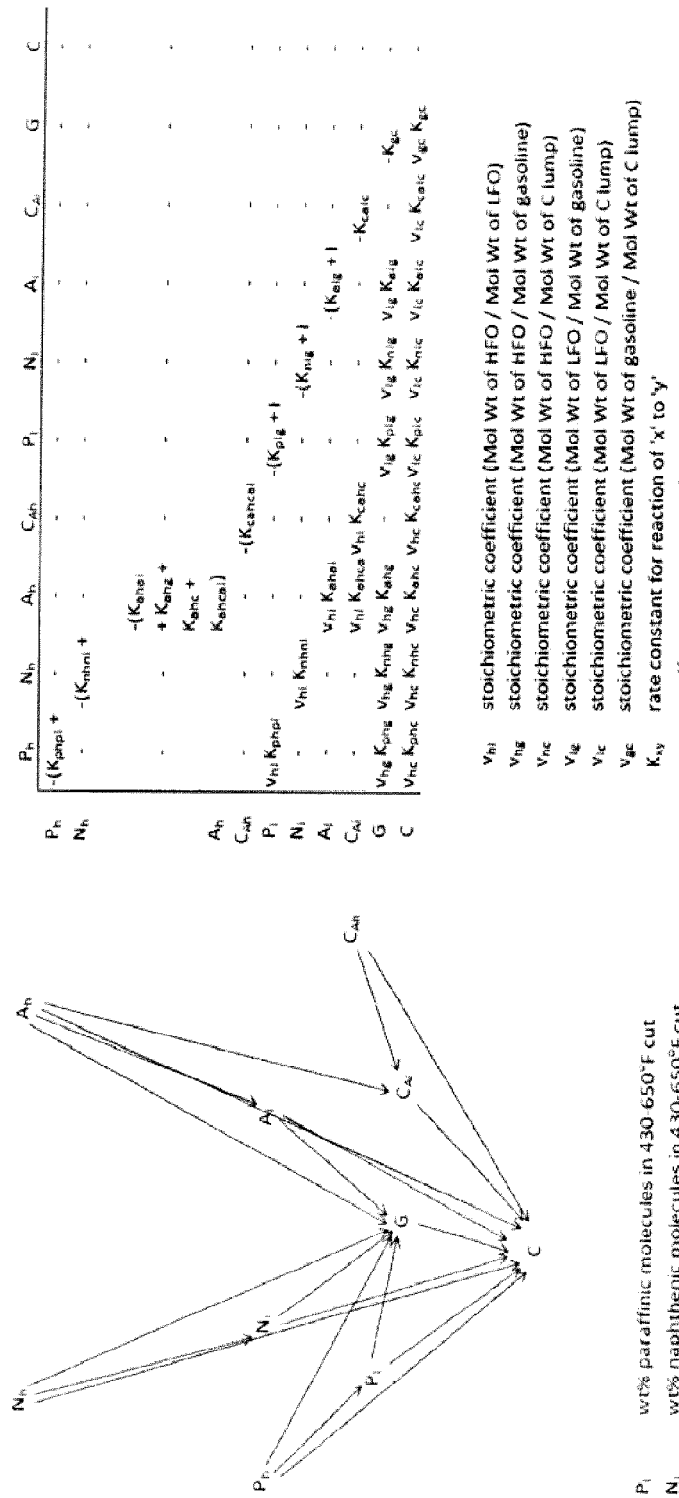

COMPUTER APPARATUS AND METHOD FOR REAL-TIME MULTI-UNIT OPTIMIZATION

CROSS-REFERENCE TO RELATED APPLICATIONS

The present application claims priority to U.S. Provisional Application No. 61/374,877 filed 18 Aug. 2010, the entirety of which is incorporated herein by reference.

BACKGROUND

1. Technical Field

The present application relates generally to computer-implemented optimization and control of refinery activities.

2. Description of the Related Art

Oil refining is a complex and valuable process. Since the introduction of computers into operating refineries, a goal has been to integrate the decision making of management with automatic actuation by control systems. For many years, refiners have been developing computer programs to optimize the operation of oil refineries. This computer-based optimization activity can be divided into three types of solutions: planning and scheduling, multivariable constraint control (MVC), and real-time modelling and unit optimization of various refinery operating units. To date, however, each of these types of solutions has inherent limitations or deficiencies that have inhibited the development of a satisfactory integrated solution.

A first type of solution is the use of a refinery planning and scheduling model, which has been implemented by many refineries. Refineries must plan their operations weeks and months in advance in order satisfy the long lead times required for purchase of crude oil supply and contracts for product delivery. This is done in part by solving a linear or non-linear programming model which generally uses a multi-period, steady-state, regression based model of the entire refinery operation to calculate a refinery optimum operation plan weeks and months into the future. The refinery planning and scheduling model is usually run bi-weekly or monthly and its main purpose is to determine the best average operating conditions for the planning period, typically the next two to four weeks, for each of the refinery units in order to assure satisfaction of required product properties such as the octane number of the gasoline produced, and refinery inventory constraints on storage tanks used to hold crude oil feed, intermediate streams, and the final products that are ultimately shipped by pipeline or in batches on boats, trucks and railcars.

A weakness of this planning and scheduling model is that it is a crude representation of the operation of the entire refinery, which is a complex set of chemical processes. Another is that the planning and scheduling model and its input data require manual update because the input data is not directly measurable in the process. The model in this solution represents an average of the period being modelled; so, for example, it cannot distinguish between daytime and nighttime operation when changes in ambient temperature can have a dramatic impact on the optimum operating point of the refinery. The inability to match the planning model to the current behavior of the process and the modelling of only average behavior often results in a planning model that significantly deviates from the actual refinery behavior. The planning model therefore requires specific know-how from the users of the model to adjust the solution so that it is achievable by the refinery operators. While planning and scheduling software has been developed to make the manual manipulation of the planning solutions easier than in the past, the planning and scheduling model's limitations are a cause of poor integration with actual operational decisions in the refinery.

A second solution used in refinery optimization that has received wide attention and implementation is multivariable constraint control (MVC). Multivariable regression models, which include pricing constraints, are derived from process data that is generated by conducting experiments on individual process units, such as the fluid catalytic cracking unit (FCCU). The models are solved using linear, but sometimes non-linear, optimizers to arrive at control parameters that are applied by controllers to each of the individual process units. Recent advances in MVC model identification have made these regression models very reliable and easily derivable even under closed-loop operation of the individual process units. The objective function pricing values are often supplied by the previously mentioned refinery planning and scheduling optimization.

A weakness of these MVC controllers is the nature of the model. Because it is derived from regression of operating data, there is some reduction in fidelity of the model to actual operation; and the optimization of the MVC model will not reliably extrapolate a solution outside of its experience since the model is derived from operating data. Another problem is that the pricing values generated by the scheduling and planning optimization that are fed into the MVC model are not generally directly usable by the MVC's optimizer due to differences in the problem structure. This requires manual reconciliation of the differences in pricing between planning and scheduling and MVC in order to obtain the desired results.

In response to these recognized weaknesses, refiners have attempted to implement a third type of optimization, unit optimization, in their refineries in the form of first-principles models of the refinery operating units such as Crude and Vacuum Distillation, fluid catalytic cracking (FCC) and Hydrocracking in order to calculate an accurate optimum for each individual process unit. These optimization models consist of detailed models based on first principles of chemistry and physics of reaction kinetics, tray by tray distillation, valves, heat exchangers and all of the process equipment in the process unit. In addition, the stream flows are disaggregated into very detailed representation of the molecules and compounds that are constituents of crude oil and its product streams, even though few of these components can be directly measured in the process streams. The resulting models are very large and complex sometimes consisting of as many as 60,000 equations for a single process operating unit.

In this configuration these unit optimizations sit in a hierarchy below the refinery planning and scheduling model and above the process unit MVCs. The purpose of these optimizers is to overcome a lack of fidelity in the MVC models. While these types of unit optimizers have reportedly been successfully implemented with initial reports of high profit, only a small number of refining companies have attempted to implement these optimizers due to the complexity of the models and the intensive effort of highly skilled engineers required to implement them. Even then, due to the complexity and difficulty of maintaining the models and their optimization, refineries have abandoned this solution and returned to the use of planning optimization and the MVC solution for refinery optimization. A further reported problem is that the increased profits in using complex unit optimizers of this type over the above-mentioned solutions can only be measured when unit optimization was initiated; after a period of operation, it becomes difficult to determine how much additional profit was being realized by this solution without actually turning off unit optimization and returning to the basic combination of planning optimization and MVC controllers. This problem is due to shifts in the operational baseline resulting from changes in the mix of crude oils being processed, and changes in the products and product distribution goals of the refinery.

Another deficiency in these unit optimizations is that they fail to capitalize on the opportunity to optimize inter-unit interaction. Because planning and scheduling optimization, in part, attempts to optimize inter-unit interactions, some refiners have attempted to link unit optimizations with each other to try to achieve refinery-wide optimization with the aforementioned first-principles models. However, these implementations are much larger, involving hundreds of thousands of equations, and are more complex and more difficult to maintain than a single unit optimization.

There have been attempts to link MVCs together by a coordinating linear program that receives its pricing from the planning optimization and integrates the operation of the MVCs. The main failing of this approach is in the limitations of the linear model of highly non-linear reaction processes such as the FCC. In a variation on this approach users have attempted to operate closed form kinetic models of such non-linear reaction processes on-line and calculate numeric derivatives of these models, which are then passed to the coordinating linear program in order to allow it to approximate the non-linear process behavior. One serious deficiency in this approach is that the closed form kinetic models are difficult to automatically match to current reaction process conditions. Another is that the derivatives computed for these models are calculated by sequentially perturbing each input and solving the model, which is a tedious and computationally burdensome process. Further, in order to ensure convergence of the kinetic models, the user must set wide convergence criteria, which may result in unreliable and noisy derivatives that change significantly from solution interval to solution interval. In practice, these noisy derivatives are not implemented and this solution reverts to be a fixed linear program coordinating MVCs, resulting in the loss of the benefit of having a first principles model while introducing significant complexity in the implementation.

BRIEF DESCRIPTION OF THE DRAWINGS

In drawings which illustrate by way of example only embodiments of the present application.

FIG. 2A is a table illustrating examples of components that may be processed by the various units in the refinery optimization system of FIG. 1.

FIG. 4 is a simplified flow diagram of an example Fluid Catalytic Cracking Unit showing the reactor, regenerator and distillation columns.

FIG. 5 is an illustration of a kinetic model for an example Fluid Catalytic Cracking Unit reactor.

DETAILED DESCRIPTION

The embodiments described herein provide a solution to the foregoing problems in multi-unit optimization of a refinery or a similar process, such as an ethylene production process in which naphtha or ethane is cracked in thermal cracking reactors to produce ethylene, propylene and other chemicals which are then separated in a distillation train, using steady-state models based on first principles of physics and chemistry. In particular, a computer apparatus and method is provided to calculate a refinery operating optimum which integrates with presently available refinery planning and scheduling optimizers and process unit MVCs. First principles, rigorous, kinetic models are employed for refinery reaction processes such as FCC, Hydrocracker, and gasoline Reformer. Gain-only models derived from regression of process data are used for all other processes within the refinery operation that are linear or behave linearly in the permissible operating space, such as distillation. The derivation of the kinetic models and gain-only models are within the abilities of the person of ordinary skill in the art. For example, the gain-only models may be the same as those used for MVC models.

Figure 1:
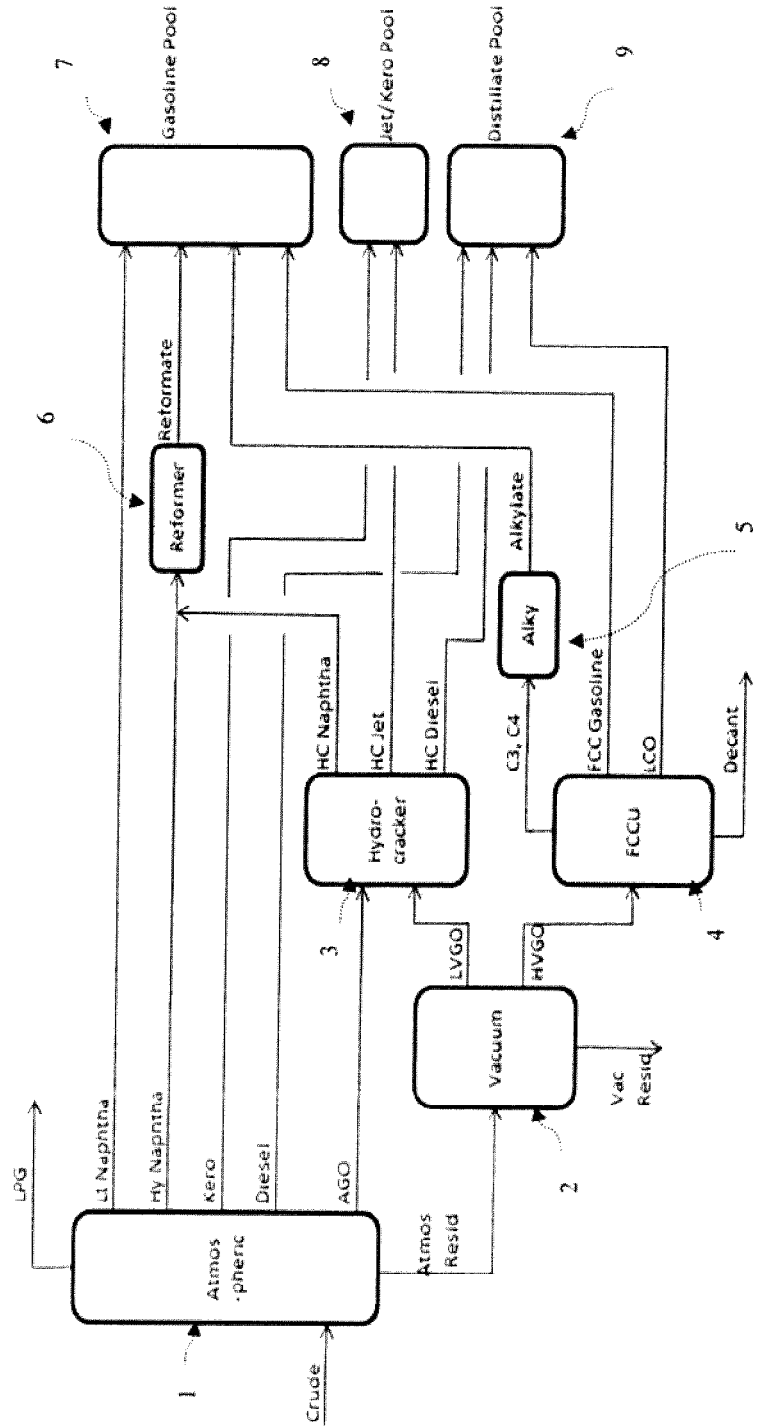
FIG. 1 is a flow diagram of a typical crude oil refinery.

FIG. 1 is a flow diagram of a set of key process units in an example refinery to which real-time, economic optimization may be applied. FIG. 1 is representative of a typical refinery, in which crude distillation column 1 provides input to a hydrocracker process unit 3, for example in the form of atmospheric gas oil (AGO). Other fractions extracted by the crude distillation process such as light and heavy naphtha, kerosene and diesel may be delivered to other units within the refinery. Heavy naphtha, for example, can be input to a reformer unit 6. Residue from the crude distillation process is input to a vacuum distillation process unit 3, which in turn provides input to downstream processes in the refinery. For example, heavy vacuum gas oil (HVGO) and light vacuum gas oil (LVGO) output from the vacuum distillation process unit 3 are input to the downstream hydrocracker process unit 3 and the FCCU 4, respectively.

The hydrocracker unit outputs naphtha, jet and diesel fuels, which in turn are input to downstream units; in this example, the hydrocracker naphtha is input to the reformer unit 6. The FCCU 4 output includes propane and butane, which are input to an alkylation unit 5, gasoline, and light cycle oil. The various outputs from the crude distillation unit 1 and the downstream hydrocracker unit 3, FCCU 4, alkylation unit 5 and reformer 6 are delivered to various gasoline, jet/kerosene and distillate pools 7, 8, 9 respectively for storage. For example, crude distillation output light naphtha and the reformate output from the reformer 6 as well as the alkylate output from the alkylation unit 5 and the gasoline output from the FCCU 4 are delivered to the gasoline pool 7, while the crude distillation output kerosene and hydrocracker output jet fuel are delivered to the jet/kerosene pool 8 and the crude distillation output diesel, hydrocracker output diesel, and light cycle oil are delivered to the distillate pool 9. The components of the various unit models are shown in FIG. 2A.

It will be appreciated by those skilled in the art that the flow diagram of FIG. 1 is representative only of select process units and components of the notional refinery. There are of course processes, other units and components that of the refinery that are not illustrated for ease of reference, such as hydrotreating reactors for removing sulfur from some product streams, tanks, pumps, valves and so forth. It will also be appreciated that the various components that are illustrated in FIG. 1 typically include further components; for example, each of the hydrocracker 3, FCCU 4, alkylation unit 5 and reformer unit 6 are provided with distillation columns and/or other components that will be modelled as explained below. While FIG. 1 is representative of a typical refinery, the individual process units shown can be replicated within a physical plant; for example, there can be two or more crude and vacuum units 1, 2 that can be operated independently. Also, there can be additional process units, such as a delayed coker, that may be used depending on the type of crude oil being processed. Such variations in process units will simply involve a modification to the real-time model of the process described herein which, given the teachings of this specification, will be within the ability of the person of ordinary skill in the art.

Figure 2:
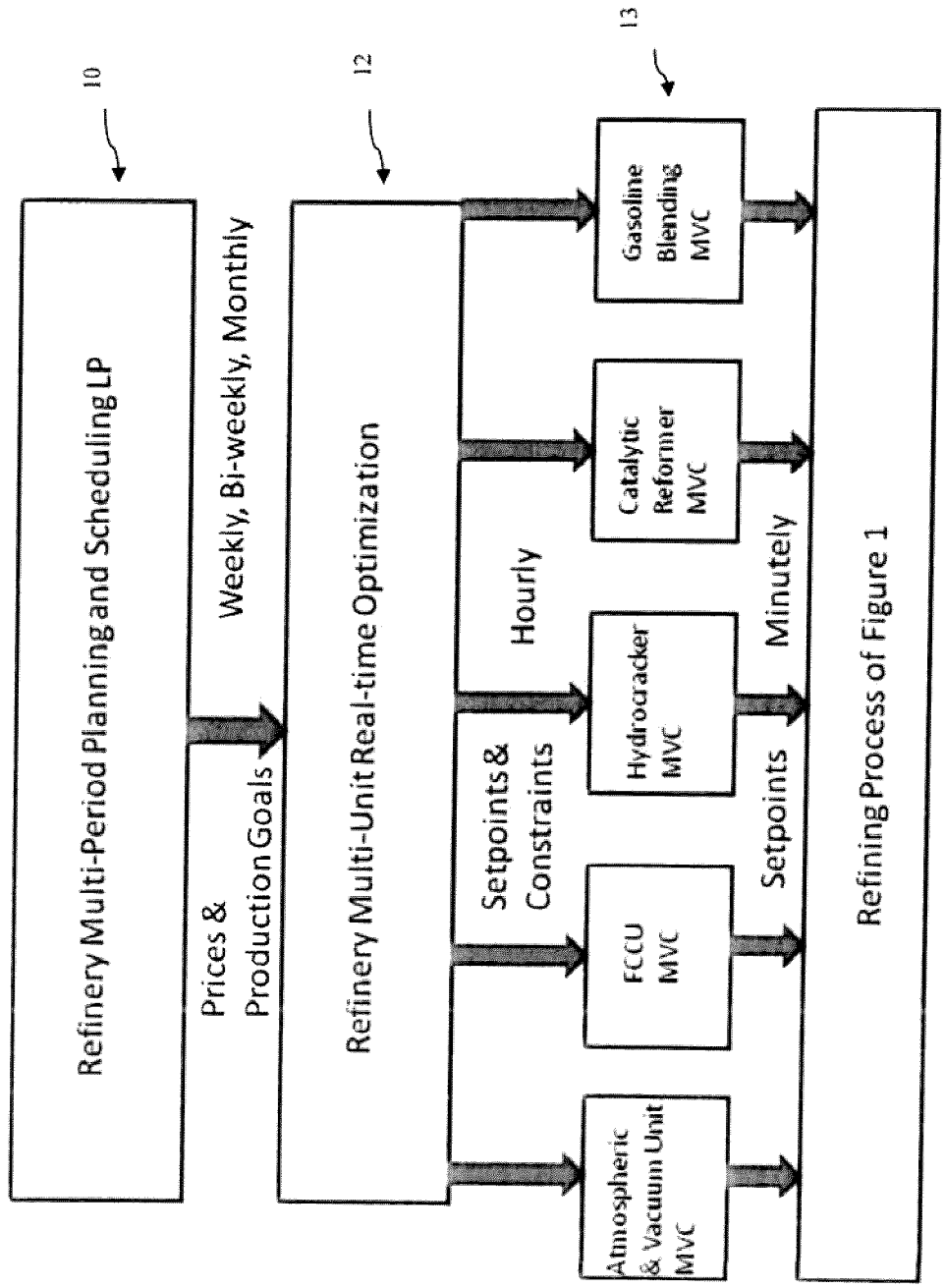
FIG. 2 is a flow diagram illustrating a hierarchical structure of a refinery optimization system including a multi-unit, real-time optimization module.

FIG. 2 shows the hierarchical structure of an optimization system to be employed within a refinery such as that illustrated in FIG. 1. A multi-unit, real-time optimization module 12 is advantageously disposed between a planning and scheduling linear programmer or optimizer 10 and MVC controllers 13 controlling the various process units described with reference to FIG. 1. The optimization module 12 can include a non-linear optimizer employing a software non-linear programming solver such as such as MINOS, available from Stanford Business Software, Inc., Palo Alto, Calif. 94306-0398 or software implementing sequential quadratic programming (SQP), or other commercially available non-linear optimization software. The optimization module 12 engages in solving for an optimization of a process model for all of the refinery processes, or a selected subset of processes, on a periodic basis, for example hourly or at least several times per day. The process model solved is posed in the form of an open-equation problem representing a steady-state model of the refinery's processes using non-linear kinetic models of reaction processes in the plant and linear models of any other processes, in which all equations are solved simultaneously. The purpose of this formulation is so that in the solution sequence generated by the optimization module 12 can be reconciled against steady-state process operating data by solving a constrained quadratic optimization problem to optimally match the model against the current operating state of the refinery, followed by a solution of the same open-equation model using a priced objective function to seek the improved, optimum operating point in face of process variability and change. Advantageously, derivatives of the equations with respect to the solution variables are expressed analytically so that the problem of noisy derivatives is disposed of.

The optimization module 12 receives pricing data for each stream from the planning and scheduling optimizer 10, and sensor-measured variables from the refinery processes, and sends targets and constraint limits computed by its optimization solution directly to the MVCs 13. The optimization module 12 includes modules to check pricing data for reasonableness, and can be configured to alert a human operator in the event the pricing is not reasonable, so that the operator can optionally run off-line cases to study the effect of the new pricing before implementing it online. The sensor-measured variables can include stream flows, stream 90% boiling points, percentage content of pure components, stream temperatures, and reactor temperatures. The sensor data may be received substantially continuously or only periodically (for example hourly). In some embodiments, the input values to the optimization solution, including stream 90% boiling points, percent content of a pure component, or road and motor octane number, may be inferred from raw data. The input values may also be determined from laboratory-measured variables, for example as in the case of octane number.

Figure 3:
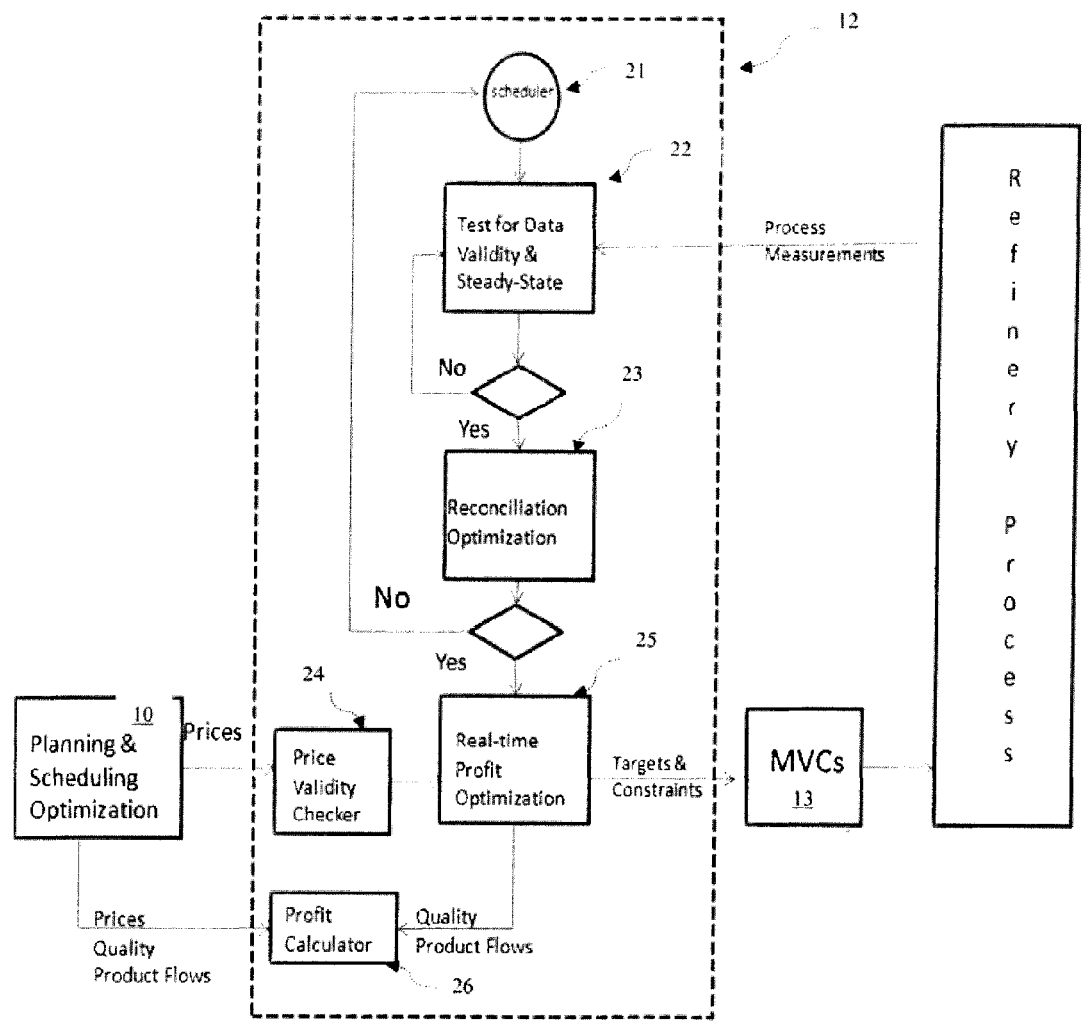
FIG. 3 is a schematic diagram illustrating the multi-unit, real-time optimization module of FIG. 2.

FIG. 3 shows more detail of the components of the multi-unit, real-time optimization module 12. The unit provides a multi-unit real time optimization process beginning with a scheduling module 21, which the user may set to operate on a periodic schedule such as once per hour, for example. The scheduling module 21 initiates a test process module 22 that receives process measurements for each of the process units (e.g., selected from those of FIG. 1) accounted for in the optimization process and operates to determine whether or not each of the processes is in a steady state.

The test process module 22 examines selected process measurements for each process unit which are inputs to the test function of the test process module 22. A first test implemented by the module 22 is to determine if the process measurement values detected by sensors at the refinery process unit are valid. The sensors typically detect and record periodic measurements from the process unit, for example once every minute. For example, one validity test is for change from measurement values read during a last scheduled test. If the values have not changed for some time the sensor used to determine the process measurements is presumed to have failed and the measurement is deemed to be bad or invalid. If this is the case, the process measurement value is re-tested at a later time (for example, after the sensor problem is corrected) by the test process module 22.

Once the values have been determined to be valid, the set of valid values is tested to determine if the corresponding process unit is in a steady state or not. The steady-state test can be to determine whether or not the standard deviation of the last hour of one minute values of a particular measurement detected by the process unit sensor is less than a specified maximum amount. This test can be applied to a group of selected process variables used to define the operation of the process unit. If the tests conducted at the test process module 22 are satisfied, the next step is to reconcile the process model to be optimized against the set of validated current process measurements by the reconciliation optimization module 23.

Reconciliation of plant data is preferred because there is always sufficient error in process measurements so that material and energy balances will not close 100%. However, in order for a valid optimization solution to be calculated the problem should start at a mathematically balanced starting point. The reconciliation optimization module 23 operates on a set of model equations representing a model of the plant and its process units, a portion of which is shown in FIG. 5. Development of model equations will be known to those skilled in the art. The reconciliation optimization module 23 subjects the model equations to the reconciliation objective function:

$$\min F = \Sigma_i \mathrm{Wt}_i (\mathrm{Meas}_i - \mathrm{Model}_i)^2$$

where for each measured value i, Meas is a plant measurement value or the measured input, Model is a model-calculated value or estimated value corresponding to the plant measurement, Wt is a weighting factor or penalty function on the error (i.e., the difference between Meas and Model, squared). The values of Wt are set based on the known reliability of the measurements, Meas. For example, the variables identified as invalid in the validity test have Wt=0, while those that are considered highly reliable such as temperatures have much larger penalties. The sum of the weighted errors is taken over all measured values.

Once the reconciliation is completed the values of the reconciled variables output by the reconciliation optimization module 23 become the input variables for the real-time economic optimization module 25. The real-time economic (or profit) optimization module 25 carries out an economic optimization of the same model equations used by the reconciliation optimization module 23, but now subject to the economic optimization function:

$$\max F = \sum_i (Model_i - Target_i) \left[ Cost_i + \sum_j Qcost_j(Qmodel_j - Qtarget_j) \right]$$

where $Model_i$ is each reconciled process variable value from the reconciliation optimization module 23; $Target_i$ can be an externally-set target or constraint corresponding to the variable (e.g., stream 90% boiling points, percent content, octane number, stream and/or reactor temperature, production stream volume, or production stream quality), and is calculated by the planning and scheduling optimization unit 10; $Cost_i$ is a price per unit of the target as determined by the planning and scheduling optimization unit 10; $Qmodel_j$ is a set of process variable qualities calculated in the model, a special subset of $Model_i$; $Qmodel_j$ values are optimized against $Qtarget_j$, which are quality targets for the various stream flows for each of the process units, and are also calculated and provided by the planning and scheduling optimization module 10. $Qcost_j$ is the price per unit corresponding to $Qtarget_j$, and is also provided by the planning and scheduling optimization module 10. The resultant optimized variables from the economic optimization function solution are then provided as operating target or constraint values to each of the corresponding MVCs.

$Cost_i$ and $Qcost_j$ are preferably the last set of valid prices provided by the refinery planning and scheduling optimization module 10. When the refinery planning optimization is run by the module 10 (typically, once every two to four weeks) a new set of prices are generated for feed, intermediate streams and products and provided to a price validity checker module 24 before the prices are provided to the real-time economic optimization module 25. The price validity checker module 24 can alert the operator to significant changes in pricing compared to historical data maintained for the checker module 24, or of prices outside of a range of acceptability. While prices determined to be valid by the checker module 24 may be automatically provided as input to the real-time economic optimization module 24, operator intervention may be required to pass the new prices to the economic optimization module 24 regardless of the results of the validity test.

The output from the economic optimization module 25 and output from the planning and scheduling module 10 are provided as input to a profit calculation module 26, which compares the expected profit that would be achieved if a prior art refinery planning solution were implemented compared to the expected profit achieved by implementing the solution provided by the economic optimization module 25 using the profit calculation:

$$\text{Profit} = \Sigma\{(F - F_{LP})[\$_{LP}^F + \$_{LP}^P(P - P_{LP})]\}$$

where the variables F are a special subset of variables $Model_i$, namely, the optimized product flow rates (e.g., measured in barrels per day, or BPD), and P are a special subset of the variables $Qmodel_i$ namely the optimized product stream qualities. F and P are obtained from the economic optimization module 24. The variables $F_{LP}$, and $Q_{LP}$ are the product flow and quality targets that the planning and scheduling optimization unit 10 would have passed to the corresponding MVC without the intervention of the real-time optimization module 12. The variables $\$_{LP}^F$ and $\$_{LP}^Q$ are pricing of product flows and quality, respectively, as provided by the planning and scheduling optimization unit 10. The profit calculation thus provides an estimate of the profit achieved by the real-time optimization module 12 over the profit that would have been achieved if the planning optimization unit 10's solution had been implemented by the MVCs. It should be recognized that this profit calculation is likely a conservative estimate of the actual profit because in the current state of the art the scheduling and planning solution-MVC implementation requires significant manual intervention in order to provide the correct targets to the MVC—meaning that even if accurate, there may be a delay before the targets computed by the scheduling and planning optimization module 12 are implemented at the MVCs, whereas the profit calculated by the profit calculation module 26 is an actual result that can be achieved.

FIG. 4 is a flow diagram of an example FCCU, showing the reactor 41, catalyst regenerator 42, main fractionators 43, and light ends distillation columns 44. FIG. 5 shows a representation of the steady-state kinetic model of the reactor. The steady-state process model, also illustrated in FIG. 5, provides a significant increase in fidelity over the regression model typically used in the planning optimization while also providing a substantial reduction in complexity from first-principles unit optimization models that have been used to date in real-time unit optimization applications. The reduction in model complexity relative to current state of the art real-time optimization models results from: 1) modeling primarily the material balance behavior of the reaction processes; 2) incorporating the gain only elements of the regressed linear MVCs in the model; 3) using available kinetic models of the catalytic reaction processes; and 4) using the same stream components as those used in the planning optimization. The complexity of the model employed by the real-time optimization module 12 is substantially less than first-principles unit optimizers of the past due to the reliance on the MVCs to handle all energy balance and mechanical constraints and use of the planning model stream components. The model used in the real-time optimization module 12 focuses only on material balance and kinetic model relationships for conversion of components in reaction processes.

Thus, with reference to the simplified flowsheet of a sample refinery shown in FIG. 1, the real-time optimization module 12 solves in real time how to achieve the optimal mix of products given the pricing and long term production goals provided by the planning and scheduling optimization unit 10, while satisfying operating constraints on the units within its scope. As an example, the real-time optimization module 12 will try to achieve the production of octane barrels of gasoline in the blending mix by optimally balancing the production of octane barrels from the Reformer 6, FCCU 4, and Alkylation Unit 5. In the FCCU 4, for example, this will involve calculation of the desired gas oil feed rate, feed temperature and reaction temperature while in the Reformer 6 the feed rate and bed temperatures are the main variables to be calculated. This will simultaneously involve calculating the optimal operating targets for the Crude and Vacuum Distillation unit 2 since it is the source of the feeds to the downstream reaction units. The calculated operating targets are then implemented by the MVCs 13 in FIG. 2.

In addition to improved model fidelity a key advantage of the real-time optimization module 12 over the operating plan calculated by the planning and scheduling optimization unit 10 is that the optimization module 12 can exploit real-time change of refinery conditions such as diurnal change, variation in crude blend, and change in operating performance of the units while the planning optimization module 12 can only work on averages. A simple example of the benefits of the real-time optimization module 12 is that in a refinery which is constrained by heat removal capacity the optimal time to push production is at night and unlike the MVCs, the real-time optimization module 12 can be used to optimally re-distribute the production of octane barrels between the various units.

There is thus provided a system and method, the system being implementable in a computer apparatus or system, for real-time optimization of a process which is scheduled by a single-period or multi-period planning optimization and controlled by multivariable constraint controllers; comprising of a steady-state model which consists of non-linear kinetic models of the reaction processes and linear models of all other processes; a non-linear optimizer which reconciles the model to real-time process measurements, and computes an optimum operating point using prices supplied by the process planning optimization, and sends the solution for implementation to the multivariable constraint controllers. In one aspect, one or more sources of continuous, quasi-continuous or intermittent sensor measured variables are provided as input for the control and optimization of the process, the sensor measured variables comprising stream flows, stream 90 percent boiling points, percent content of a pure component, stream temperatures, and reactor temperatures. In still a further aspect, one or more sources of inferred or computed variables may be supplied, the inferred or computed variables including stream 90 percent boiling points, percent content of a pure component, road and motor octane number and a source of laboratory measured variables, such as motor octane number. In still a further aspect, there may also be provided one or more sources of stream pricing, production stream volume targets for the stream flows, and production stream quality targets for the stream 90 percent boiling points, percent pure components, and road and motor octane numbers, and stream and reactor temperature targets, as calculated by the process planning and scheduling optimization.

The system and method may include a non-linear solution engine such as an NLP or SQP for determining constraints for controlling the process. Further, operating targets such as stream quality targets, stream temperature targets and reactor temperature targets may be transmitted to the MVCs operating the process. The steady-state model may be expressed in open equation form with derivatives of the model equations of the steady-state model. Gains of the linear models of the steady-state model may be extracted. Stream compositions from the steady-state model may be expressed to match the stream components of the process planning optimization. The model expressed in open equation form may be reconciled in real time to the sources of sensor measured variables and the inferred variables. The system and method may also provide for real-time optimization of such a reconciled model using the aforementioned stream pricing such that the profit objective is to improve on the off-line planning optimization solution. Profit generated by the real-time optimization may be continuously or quasi-continuously calculated in real time.

Further, there is provided a system adapted to control the plurality of process units in real time, which may be implemented in a plant comprising a plurality of production process streams produced by a plurality of process units, each of the plurality of process units being controlled by a corresponding one of a plurality of multivariable constraint controllers, a system, the system comprising: a test process module configured to determine validity of input process measurements for each of said plurality of process units and to determine whether a process of each of said plurality of process units is in a steady state; a reconciliation optimization module configured to receive the input process measurements thus validated from the test process module and to reconcile a process model for said plurality of process units against said validated input process measurements by applying a reconciliation objective function to provide a set of reconciled variables for the process model; an economic optimization module configured to receive a plurality of constraints and prices corresponding for the plurality of process units from a planning and optimization module and the set of reconciled variables, and to optimize said process model thus reconciled by applying an economic optimization function subject to the plurality of constraints to determine a set of operating targets for each of the plurality of process units; and the system being adapted to provide the set of operating targets to the plurality of multivariable constraint controllers.

In one aspect, the system also comprises a price validity checker module configured to determine a validity of the price per unit target.

In another aspect, the system further comprises a profit calculation module configured to receive the set of operating targets and to determine an expected profit achievable by implementing the set of operating targets.

In still another aspect, the system is configured to determine a further set of operating targets and to provide said further set of operating targets at least as frequently as daily.

There is also provided a method for controlling a plurality of production process streams produced by a plurality of process units, each of the plurality of process units being controlled by a corresponding one of a plurality of multivariable constraint controllers, the method comprising: varying operation of each of the plurality of multivariable constraint controllers by applying a set of operating targets thereto, the set of operating targets being generated to satisfy an optimization goal for a process model for the plurality of process units defined by an economic optimization function subject to a plurality of constraints and prices received from a planning and scheduling module, the process model being reconciled with a set of input process measurements for each of said plurality of process units.

In one aspect of the method, the input process measurements are steady state values.

In another aspect, the method further comprises determining an expected profit achievable by implementing the set of operating targets.

In still another aspect, the applying is executed at least as frequently as daily.

In one aspect of the system and method, the plurality of process units comprises a plurality selected from a crude and vacuum unit, a hydrocracking unit, a fluid catalytic cracking unit, an alkylation unit, a reformer unit, a gasoline product pool, a jet/kerosene product pool and a diesel product pool.

In a further aspect, the input process measurements comprise a set of sensor-measured variables corresponding to each of the plurality of production process streams.

In another aspect, the sensor-measured variables are selected from stream flows, stream 90% boiling points, percentage content of pure components, stream temperatures, and reactor temperatures.

In yet another aspect, the plurality of constraints comprises one or more of a price per unit target and a quality target for one or more of the production process streams.

In still a further aspect, the plurality of constraints comprises one or more of a 90% boiling point, a percentage content of a pure component, an octane number, a temperature, a volume and a reactor temperature, for each of the plurality of production process streams.

In yet a further aspect, the process model comprises a non-linear kinetic model of each reaction process corresponding to one of the plurality of production process streams.

There is also provided a computer program product comprising a medium that may be a non-transitory or physical storage medium, bearing or storing code which, when executed by one or more processors of a computing system, causes said computing system to execute the above described methods.

It will be understood by those skilled in the art that the invention is not limited to the embodiment described here and can be applied to any process which is scheduled using a single-period or multi-period planning model and is controlled by multivariable constraint controls.

The systems and methods disclosed herein are presented only by way of example and are not meant to limit the scope of the subject matter described herein. Other variations of the systems and methods described above will be apparent to those in the art and as such are considered to be within the scope of the subject matter described herein. For example, it should be understood that steps and the order of the steps in the processing described herein may be altered, modified and/or augmented and still achieve the desired outcome. Throughout the specification, terms such as "may" and "can" are used interchangeably and use of any particular term should not be construed as limiting the scope or requiring experimentation to implement the claimed subject matter or embodiments described herein.

The systems' and methods' data may be stored in one or more data stores. The data stores can be of many different types of storage devices and programming constructs, such as RAM, ROM, flash memory, programming data structures, programming variables, etc. It is noted that data structures describe formats for use in organizing and storing data in databases, programs, memory, or other computer-readable media for use by a computer program.

Code adapted to provide the systems and methods described above may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. Various functional units described herein have been expressly or implicitly described as modules and agents, in order to more particularly emphasize their independent implementation and operation. It is also noted that an agent, module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The various functional units may be implemented in hardware circuits comprising custom VLSI circuits or gate arrays; field-programmable gate arrays; programmable array logic; programmable logic devices; commercially available logic chips, transistors, and other such components. Modules implemented as software for execution by a processor or processors may comprise one or more physical or logical blocks of code that may be organized as one or more of objects, procedures, or functions. The modules need not be physically located together, but may comprise code stored in different locations, such as over several memory devices, capable of being logically joined for execution. Modules may also be implemented as combinations of software and hardware, such as a processor operating on a set of operational data or instructions.

A portion of the disclosure of this patent document contains material which is or may be subject to one or more of copyright, design patent, industrial design, or unregistered design protection. The rightsholder has no objection to the reproduction of any such material as portrayed herein through facsimile reproduction of the patent document or patent disclosure, as it appears in the Patent and Trademark Office patent file or records, but otherwise reserves all rights whatsoever.

The invention claimed is:

1. In a plant comprising a plurality of production process streams produced by a plurality of process units, at least one of the plurality of process units carrying out a corresponding chemical reaction process and each of the plurality of process units being controlled by a corresponding one of a plurality of multivariable constraint controllers, a system adapted to control the plurality of process units in real time, the system comprising at least one processor configured to execute:

a test process module configured to determine validity of input process measurements for each of said plurality of process units and to determine whether a corresponding process of each of said plurality of process units is in a steady state;

a reconciliation optimization module configured to receive the input process measurements thus validated from the test process module and to reconcile a process model for said plurality of process units against said validated input process measurements by applying a reconciliation objective function to provide a set of reconciled variables for the process model;

an economic optimization module configured to receive a plurality of constraints and prices corresponding to the plurality of process units from a planning and optimization module and the set of reconciled variables, and to optimize said process model thus reconciled by applying an economic optimization function subject to the plurality of constraints to determine a set of operating targets for each of the plurality of process units; and the system being adapted to provide the set of operating targets to the plurality of multivariable constraint controllers.

2. The system of claim 1, wherein the plurality of process units comprises a plurality selected from a crude and vacuum unit, a hydrocracking unit, a fluid catalytic cracking unit, an alkylation unit, a reformer unit, a gasoline product pool, a jet/kerosene product pool and a diesel product pool.

3. The system of claim 1, wherein the input process measurements comprise a set of sensor-measured variables corresponding to each of the plurality of production process streams.

4. The system of claim 3, wherein the sensor-measured variables are selected from stream flows, stream 90% boiling points, percentage content of pure components, stream temperatures, and reactor temperatures.

5. The system of claim 1, wherein the plurality of constraints comprises one or more of a price per unit target and a quality target for one or more of the production process streams.

6. The system of claim 5, wherein the at least one processor is further configured to execute a price validity checker module configured to determine a validity of the price per unit target.

7. The system of claim 1, wherein the plurality of constraints comprises one or more of a 90% boiling point, a percentage content of a pure component, an octane number, a temperature, a volume and a reactor temperature, for each of the plurality of production process streams.

8. The system of claim 1, wherein the process model comprises a non-linear kinetic model of each reaction process corresponding to one of the plurality of production process streams.

9. The system of claim 1, further comprising a profit calculation module configured to receive the set of operating targets and to determine an expected profit achievable by implementing the set of operating targets.

10. The system of claim 1, wherein the system is configured to determine a further set of operating targets and to provide said further set of operating targets at least as frequently as daily.

11. The system of claim 1, wherein the plurality of process units carries out at least one chemical reaction process and at least one distillation process.

12. A computer-implemented method for controlling a plurality of production process streams produced by a plurality of process units, at least one of the plurality of process units carrying out a corresponding chemical reaction process and each of the plurality of process units being controlled by a corresponding one of a plurality of multivariable constraint controllers, the method comprising:
    determining validity of input process measurements for each of said plurality of process units, wherein a corresponding process of each of said plurality of process units is in a steady state;
    reconciling a process model for the plurality of process units against the validated input process measurements by applying a reconciliation objective function to provide a set of reconciled variables for the process model;
    optimizing the process model by applying an economic optimization function subject to a plurality of constraints and prices to determine a set of operating targets for each of the plurality of process units; and
    varying operation of each of the plurality of multivariable constraint controllers by applying the set of operating targets to the multivariable constraint controllers.

13. The method of claim 12, wherein said input process measurements are steady state values.

14. The method of claim 12, wherein the plurality of process units comprises a plurality selected from a crude and vacuum unit, a hydrocracker, a fluid catalytic cracking unit, an alkylation unit, a reformer unit, a gasoline product pool, a jet/kerosene product pool, and a diesel product pool.

15. The method of claim 12, the input process measurements comprise a set of sensor-measured variables corresponding to each of the plurality of production process streams.

16. The method of claim 15, wherein the sensor-measured variables are selected from stream flows, stream 90% boiling points, percentage content of pure components, stream temperatures, and reactor temperatures.

17. The method of claim 12, wherein the plurality of constraints comprises one or more of a price per unit target and a quality target for one or more of the production process streams.

18. The method of claim 12, wherein the plurality of constraints comprises one or more of a 90% boiling point, a percentage content of a pure component, an octane number, a temperature, a volume and a reactor temperature, for each of the plurality of production process streams.

19. The method of claim 12, wherein the process model comprises a non-linear kinetic model of each reaction process corresponding to one of the plurality of production process streams.

20. The method of claim 12, further comprising determining an expected profit achievable by implementing the set of operating targets.

21. The method of claim 12, wherein said determining, reconciling, optimizing, and varying is executed at least as frequently as daily.

22. A computer program product comprising a non-transitory storage medium, storing code which, when executed by one or more processors of a computing system, causes said computing system to execute the method of claim 12.

23. The method of claim 12, wherein the plurality of process units carries out at least one chemical reaction process and at least one distillation process.

* * * * *